United States Patent [19]

Kaplan et al.

[11] Patent Number: 4,891,169
[45] Date of Patent: Jan. 2, 1990

[54] TRANSITION DUCT FOR CENTRIFUGAL FAN

[75] Inventors: Vladimir Kaplan, Silver Spring; Richard H. Harrison, Jr., Columbia, both of Md.

[73] Assignee: AMSTED Industries Inc., Chicago, Ill..

[21] Appl. No.: 271,693

[22] Filed: Nov. 16, 1988

[51] Int. Cl.[4] .............................................. B01D 47/00
[52] U.S. Cl. ...................... 261/30; 415/207; 415/182.1; 138/39; 138/177; 285/177
[58] Field of Search .................. 261/30; 415/203, 204, 415/206, 207, 182.1; 138/37, 39, 177; 285/177, 424, 178

[56] References Cited

U.S. PATENT DOCUMENTS

| 1,467,168 | 9/1923 | Kaplan | 415/209 |
| 2,216,864 | 10/1940 | Wasmund | 285/424 |
| 2,590,797 | 3/1952 | Siciliano | 138/39 |
| 3,132,190 | 5/1964 | Engalitcheff, Jr. | 261/30 |

FOREIGN PATENT DOCUMENTS

| 14611 | 2/1981 | Japan | 138/37 |
| 18108 | 2/1981 | Japan | 138/37 |

OTHER PUBLICATIONS

Time Saving Furnace Pipe and Fittings by Buckeye Furnace Pipe Company, Sep. 1957, pp. 10 and 13.
Grand Island Furnace & Supply Co., G.I. Catalog 502, Sep. 1957, pp. 4 and 13.
Standard Furnace Supply Co., Sep. 1957.

Primary Examiner—Robert E. Garrett
Assistant Examiner—John T. Kwon
Attorney, Agent, or Firm—Edward J. Brosius; Charles E. Bouton

[57] ABSTRACT

The present invention provides a curvilinear transition duct for use with a centrifugal fan that affords optimal fan efficiency without undue duct length. The duct comprises a top section of generally concave planar shape when viewed from above and a bottom section. Side sections join the top and bottom sections to form a four sided structure having an inlet opening at one side and an outlet opening at the other side. The preferred bottom section is of a generally longer longitudinal length than the top section. Further, the preferred duct has a plane in contact with the edges of the inlet opening which intersect a plane in contact with the outlet openings at a level above the duct. The angle formed between the planes would be 1° to 60°.

11 Claims, 2 Drawing Sheets

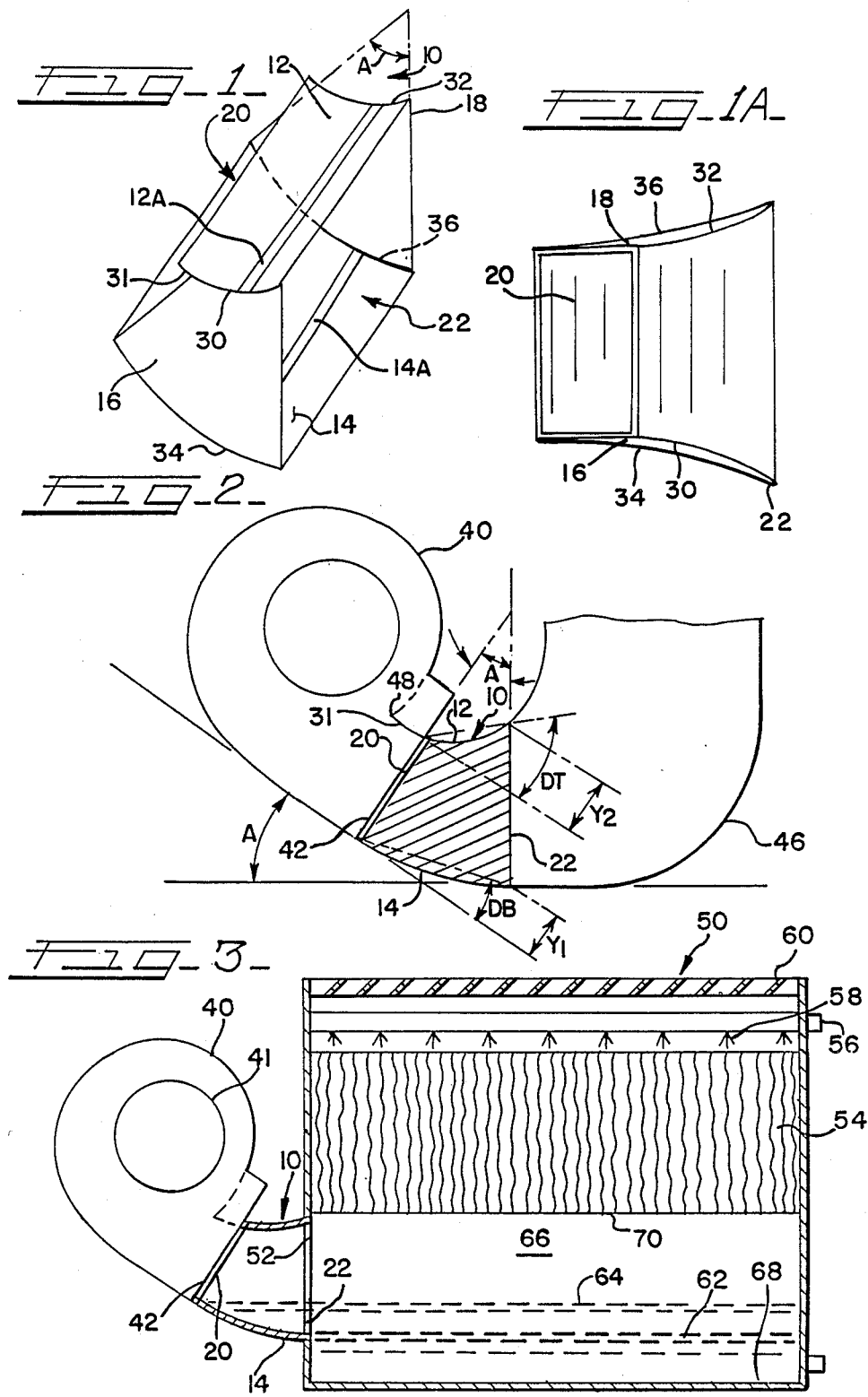

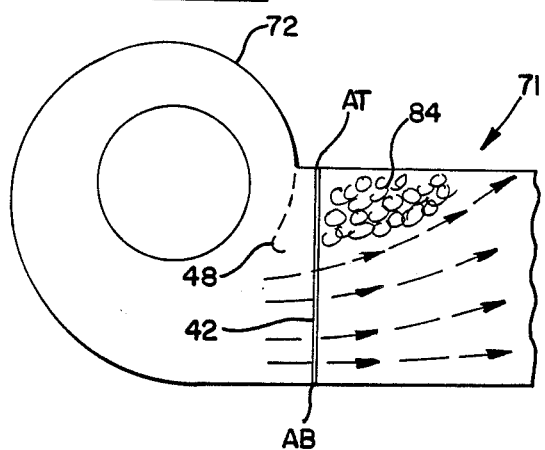
FIG-4-
PRIOR ART
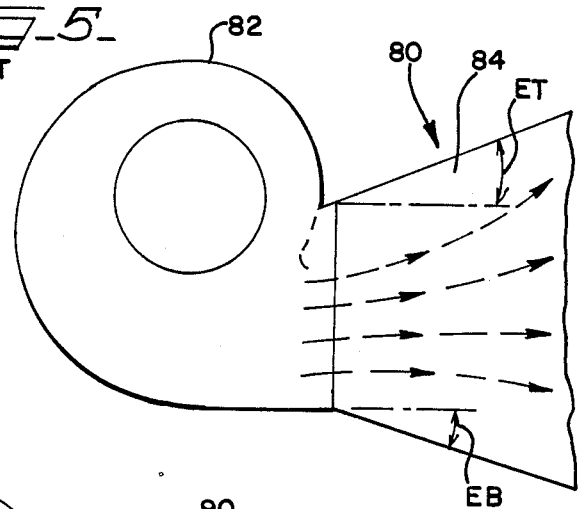
FIG-5-
PRIOR ART
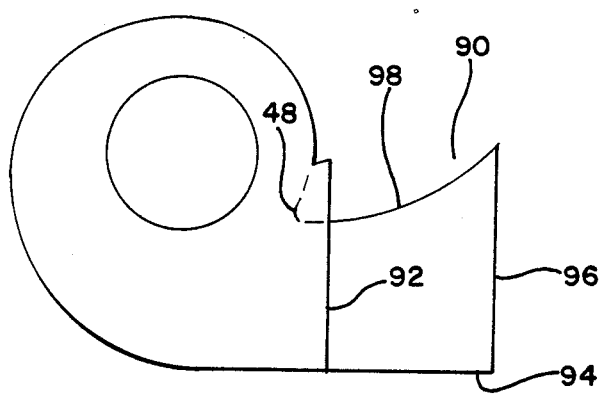
FIG-6-

TRANSITION DUCT FOR CENTRIFUGAL FAN

BACKGROUND OF THE INVENTION

The present invention relates to fan ducts and, more particularly, to a transition duct between the air mover, i.e., centrifugal fan, and air consumer, i.e., system being served by the air mover.

In many centrifugal fan applications space is limited and yet may be a critical design consideration. Most applications require that the fan be connected to an outlet transition duct, the length and design of which can greatly affect the overall performance of the overall system fan efficiency. Traditionally, this duct has been of considerable length and of a symmetrical configuration in the cross section perpendicular to the air flow direction.

In the Fan Application Manual of the Air Moving & Conditioning Association, the section at pages 22-23 indicates that maximum efficiency shown in the rating tables supplied by a manufacturer "will not be achieved unless a comparable (transition) duct is included in the system design ...For 100% (velocity) recovery the (transition) duct should extend at least two and one half equivalent duct diameters." The equivalent duct diameter for a rectangular duct is determined by a duct's height "a" and width "w" and equals $$\sqrt{\frac{4aw}{\pi}}.$$

For normal air outlet velocities of about 4,000 feet per minute (1,219 meters per minute) transition duct length should be as long as 4 equivalent duct diameters, according to the manual. The loss of fan efficiency can be as much as 50% if an elbow or similar bend in the duct were very close to the fan outlet.

The conventionally recommended transition duct lengths have resulted in serious design problems and limitations on certain fan applications, as when fans are close-coupled to cooling towers. To obtain optimal fan efficiency, space has to be allotted for the recommended transition duct length. For example, in certain cooling tower applications, it is desirable to have the cooling tower as low and narrow as possible. Where a centrifugal fan is used in the cooling tower to either intake air into the cooling tower or to exhaust air from the cooling tower, it is necessary to allot extra height and width to the cooling tower to accommodate the recommended transition duct length.

SUMMARY OF THE INVENTION

Accordingly, it is an object of the present invention to afford a curvilinear transition duct for use with a fan that provides optimal fan efficiency without undue duct length.

Another object of the present invention is to utilize a curvilinear transition duct with a centrifugal fan in a cooling tower to improve the efficiency of the entire air moving system.

Another object of the resent invention is to improve air distribution across the cooling tower.

Another object of this invention is to provide a new transition duct which eliminates severe turbulence in the cut-off region, typical for the traditional symmetrical ducts and to provide a smooth, non-abrupt continuity in the extension of the spiral chamber of the fan housing, thus affecting a high degree of velocity pressure recovery.

The stated above objects of the invention are achieved by forming a transition duct of an asymmetrical configuration, and by connecting the upper panel of this duct to the cut-off element of the fan.

The transition fan duct of the present invention is a four sided duct wherein the top section or plate is concave when viewed from above. Two side sections join the top and bottom sections to form the duct.

The overall longitudinal length of the duct in the air flow direction is less than the equivalent duct diameter. This is an abrupt departure from the art currently taught in the field. The savings in space due to decreased duct length produce significant reductions in design sizes for the heating and cooling systems or cooling towers in which the duct of the present invention is utilized. Such a savings is especially desirable in a cooling tower wherein decreased overall height and width is desired. When a centrifugal fan is utilized with the duct of the present invention, the fan can be mounted from a horizontal discharge to the duct, whereupon the outflow from the duct will be slightly upward due to the acute angle between duct inlet and outflow faces. Alternatively, the fan can be rotatably mounted to discharge downwardly from the horizontal so that the outlet air direction from the duct would be horizontal. Such an arrangement is preferred in cooling tower applications.

BRIEF DESCRIPTION OF THE DRAWINGS

In the drawings,

FIG. 1 is a perspective view of a transition fan duct in accordance with the present invention;

FIG. 1A is a top view of a transition fan duct in accordance with the present invention;

FIG. 2 is a side view of a centrifugal fan connected to a fan transition fan duct in accordance with the present invention;

FIG. 3 is a side view in partial cross-section of a counterflow cooling tower having a centrifugal fan connected to a fan transition duct in accordance with the present invention;

FIG. 4 is a side view of a conventional straight rectangular fan-duct assembly;

FIG. 5 is a side view of a conventional symmetrical expanded fan-duct assembly; and FIG. 6 is a side view of a centrifugal fan connected to a second embodiment of a fan transition duct in accordance with the present invention.

DESCRIPTION OF THE PREFERRED EMBODIMENT

Referring now to FIG. 1 of the drawings, a curvilinear transition duct in accordance with an embodiment of the present invention is shown generally at 10. Duct 10 is usually comprised of sheet metal and is usually galvanized for corrosion resistance. Top section 12 of duct 10 is comprised of a concave (when viewed from above duct 10) metal section. Top section 12 is concave along the longitudinal duct axis which is defined as the one coinciding with the direction of air movement. Bottom section 14 of duct 10 may be straight or concave along the longitudinal duct axis (when viewed from above duct 10). End sections 16 and 18 are generally identical, metal sections. They may be slightly curved for cases where the duct also expands sideways as shown in FIG. 1A. End sections 16 and 18 have top edges 30 and 32, respectively, that are joined to respective side edges of top section 12. Accordingly, top edges 30 and 32 of end sections 16 and 18 are curved in a concave manner (when viewed from above duct 10) corresponding to the curvature of top section 12. End sections 16 and 18 also have bottom edges 34 and 36, respectively, that are joined to respective side edges of bottom section 14. Accordingly, bottom edges 34 and 36 of end sections 16 and 18 may be curved in a concave manner (when viewed from above duct 10) corresponding to cases where the bottom section 14 may be curved. The aforesaid top and end sections are shown to curve smoothly while bottom section may be straight or curved. However, it is to be understood that bottom section 14 may comprise or include one or a plurality of flat increments 14A, and top section 12 may comprise or include a plurality of flat increments 12A, so long as the overall transition duct is a generally flared so as to gradually diverge. This insures that the height of outlet 22 is always greater than the height of inlet 20.

Air inlet 20 is formed by the four edges of top section 12, side section 16, bottom section 14 and side section 18 at one longitudinal side of duct 10. Air outlet 22 usually is formed by the four edges of top section 12, side section 16, bottom section 14 and side section 18 at the other longitudinal side of duct 10. The overall height of outlet 22 always is greater than the height of inlet 20. Accordingly, the height of end sections 16 and 18 at outlet 22 is greater than their height at inlet 20. End sections 16 and 18 are preferably curved outwardly sideways toward outlet 22 such that the overall width of outlet 22 is also usually greater than the width of inlet 20. Bottom section 14 is of a greater longitudinal length than top section 12. Imaginary planes contacting the edges of inlet 20 and outlet 22, when extended above duct 10, form an angle A of between 1° and 60°, and preferably between 5° and 45° in accordance with the present invention. Referring again to FIG. 2, centrifugal fan 40 is connected to inlet 20 of duct 10 so that the extension 31 of the duct's top section 12 joins the cutoff 48 of the fan, in the blast area confined between the sides and the bottom of the fan, and the cutoff element. Such configuration promotes velocity pressure recovery by emphasizing expansion downstream of the cutoff region 48. The vertically expanding contour of duct 10 eliminates the air separation present in conventional long ducts where air flow expands abruptly between the fan 42 outlet and the duct.

Fan 40 is inclined at angle A from the vertical such that outlet 22 of duct 10 is vertical. Outlet 22 is in turn connected to a system 46, such as a cooling tower. In the alternative, fan 40 could be horizontal at its base such that fan outlet 42 would be a vertical plane or would adjoin duct inlet 20. Such fan orientation is a design choice. It should be understood that duct 10 can accommodate virtually any fan orientation whether fully vertical, fully horizontal or any devised fan orientation that is dictated by the design and installation requirements.

Referring now to FIG. 3, centrifugal fan 40 is connected to duct 10 which in turn is connected at its outlet 22 to inlet 52 of counterflow cooling tower 50. Cooling tower 50 operates to cool a liquid carried in header conduit 56 which is sprayed downwardly from nozzle 58 in header conduit 56. The liquid spray contacts fill sheets 54 which are arrayed in a side by side spaced arrangement such that the liquid contacts and flows downwardly over fill sheets 54. Air, passing through the suggested transitional duct, acquires a vertical component in its streamlines due to the concave form of the top panel of the duct. Such a direction is extremely beneficial to the air distribution across the fill face area 70.

In addition, air expansion in the space between face area 70 and water level 62 as well as air expansion between the fill sheets promotes further velocity pressure recovery. Thus the entire air moving system becomes more efficient. Air is passed upwardly between fill sheets 54 and out top louvers 60. Louvers or eliminators 60 are usually closely spaced blades to collect much of the air-borne liquid droplets blown upwardly by the air and force it to fall downwardly onto fill sheets 54. The liquid is cooled as it passes downwardly along fill sheets 54 and falls to an operating level 62 in reservoir 68. The liquid is removed from reservoir 68 and used in the cooling apparatus to absorb heat. The heated liquid is returned to header conduit 56 from where the liquid exits through nozzle 58 to begin the liquid cooling operation as described above.

When the system is shut down for various reasons, the liquid spraying ceases and almost all liquid is stored in reservoir 68 at shutdown level 64.

This shutdown liquid level 64 is seen to be higher than operating level 62. Because fan 40 is connected to cooling tower 50 through a curvilinear transition duct 10, it is held upwardly and outwardly of the inlet opening 52 to chamber 66. Thus the fan 40 is located above the highest shutdown level 64 thus assuring that the liquid will never contact the fan wheel 41. Further substantial space savings are obtained by the use of transition duct 10 as opposed to a duct of a length equal, at least, to 2.5 equivalent duct diameters. Furthermore, to obtain maximum efficiency of air flow into the chamber 66 and through the fill sheets 54, it is preferred to size the curvilinear transition duct so that its outlet 22 substantially conforms to the height and width dimensions of the inlet 52 to chamber 66.

FIGS. 4 and 5 illustrate conventional fan-duct assemblies for, rectangular duct shown generally at 71 with fan 72 and in FIG. 5, a symmetrical expansion duct shown generally at 80 with fan 82. The known approach in the air moving industry is to connect the discharge duct to the outlet area as it is shown on FIGS. 4 and 5 and also as shown in Fan Application Manual of the Air Moving and Conditioning Association referred to above. These discharge ducts have equal angles of expansion ET and EB at both top and bottom panels as it is shown on FIGS. 4 and 5: $AT = AB = 0$, for rectangular duct 71 in FIG. 4 and $|+ET| = |-EB|$, for symmetrical expansion duct 80 shown on FIG. 5. In such contours, the vertical asymmetrical velocity profile of the air leaving the blast area is treated evenly across the duct's height thus diminishing the velocity pressure recovery effect in the cut off area. Furthermore, the abrupt air expansion between the blast area and the outlet area causes a significant pressure loss in the fan-duct system due to turbulence 84 downstream of the cutoff.

The asymmetrical duct of the present invention eliminates the flow separation and turbulization encountered in the symmetrical long ducts, and thus it provides means for a smooth and steady expansion of the air flow leaving the blast area.

Contrary to the conventional fan-duct assemblies where the transitional duct is attached to the outlet area 42 in FIG. 4, the asymmetrical duct of the present invention joins the fan housing 40 at the cut-off element of the blast area, and then expands symmetrically widthwise and asymmetrically heightwise (as shown in FIG. 2).

The degree of the heightwise expansion could be described in terms of top panel 12 angularity, DT, and bottom panel angularity, DB, as they are shown in FIG. 2.

Both DT and DB are defined being positive if they coincide with the fan housing scroll development direction, and being negative for an opposite direction. Although theoretically these angles could have opposite signs, practically such a situation will lead to stream separation around the central section of the duct 10, and subsequently to a diminished fan efficiency. Therefore, it is recommended that DT and DB have the same positive direction. Alternatively, angle DB may be zero for the straight bottom plate version.

The actual duct 10 expansion results from a combined effect produced by both top 12 and bottom 14 panels deviations (expansion=$f(Y_2-Y_1)$), and by the widthwise expansion caused by the fact that width of the outlet 22 may be larger than the width of the inlet 20. While the known art teaches a construction where the angles are equal and opposite directionally, the shorter asymmetrical duct 10 implies that the top angle should be greater than the bottom angle. For the suggested top duct angle DT should have a value between 5° and 64°, and taller duct angle DB should be within the range from 3° to 32°, with the preferable curved version spectrums of 10° to 47° and 5° to 19°, respectively.

A most important consideration of the asymmetrical duct geometry is the curvature of the component top panel. It should be understood that this configuration will provide a smooth and non-obstructed expansion of the air flow from the blast area to the duct or equipment served by the fan.

The asymmetrical duct provides a wide versatility in fans installations since the mounting angle A could vary depending on the application. The normal desirable range for angle A is 1 to 60° for typical air-moving fan applications, while, for example, in case of cooling towers the preferable spectrum is from 5° to 45°.

The alternative duct concept shown as 90 in FIG. 6 has zero degree angularity between inlet plane 92 and outlet 96. Note that bottom plate 94 is straight, although outlet 96 height is always greater than inlet 92 height due to the curvature of top plate 98.

What is claimed is:

1. A centrifugal fan coupled to a transition duct,
    said centrifugal fan comprising a generally cylindrical body having a generally rectangular fan outlet having sides, a bottom and a top cutoff,
    said transition duct comprising
    a bottom plate section,
    two side plate sections extending upwardly from and joined to lateral edges of said bottom plate sections,
    and a top plate section having a concave shaping along the longitudinal direction of the transition duct and having lateral edges joined to top edges of said side plate sections,
    said bottom, side and top plate sections forming a generally rectangular inlet opening at one longitudinal side of said transition duct and a generally rectangular outlet opening at the other longitudinal side of said transition duct,
    wherein said bottom plate section is of a greater longitudinal length than said top plate section such that a first plane in contact with the edges of said inlet opening intersects a second plane in contact with the edges of said outlet opening at an angle of 1° to 60°,
    and said fan outlet has an open area confined between the sides and the bottom of the fan and the top cutoff of the fan outlet coupled to the top plate of the inlet opening of said transition duct.

2. The transition duct of claim 1 wherein the side edge have sloping top edges such that the height of the inlet opening is less than the height of the outlet opening.

3. The transition duct of claim 1 wherein the bottom plate is curved by forming a plurality of flat incremental sections.

4. The transition duct of claim 1 wherein the radius of curvature of said top plate section is smaller than the radius of curvature of said bottom plate section.

5. The transition duct of claim 1 wherein the side edges are concave along the longitudinal direction of the transition duct such that the width of the outlet opening is greater than the width of the inlet opening.

6. A counterflow cooling tower comprising an air inlet section and an air outlet section,
    a centrifugal fan mounted on said cooling tower so as to force air into said air inlet section, said fan having an outlet with sides, a bottom and a top cutoff,
    and a transition duct connecting said fan and said air inlet section comprising
    a bottom plate section,
    two side plate sections extending upwardly from and joined to lateral edges of said bottom plate sections,
    and a top plate section having a concave shaping along the longitudinal direction of the transition duct and having lateral edges joined to top edges of said side plate sections,
    said bottom, side and top plate sections forming a generally rectangular inlet opening at one longitudinal side of said transition duct and a generally rectangular outlet opening at the other longitudinal side of said transition duct,
    wherein said bottom plate section is of a greater longitudinal length than said top plate section such that a first plane in contact with the edges of said inlet opening intersects a second plane in contact with the edges of said outlet opening at an angle of 1° to 60°,
    and said fan outlet has an open area confined between the sides and the bottom of the fan and the top cutoff of the fan coupled to the top plate of the inlet opening of said transition duct.

7. The cooling tower of claim 6 wherein said outlet opening of said transition duct substantially corresponds to the dimensions of said air inlet section of said cooling tower.

8. The cooling tower of claim 6 wherein said air outlet section includes fill media comprising a series of parallel sheets, and a fluid spray system having a manifold with a plurality of spray nozzles mounted above said fill media and a fluid collection pan below said fill media,
    and said centrifugal fan is mounted upwardly from said fluid collection pan such that a maximum fluid level achieved when said spray nozzles are not operating would not reach said centrifugal fan.

9. The cooling tower of claim 8 wherein said fill media is spaced vertically above said fluid collection pan such that a space is formed between the lower edge of the fill media and the fluid collection pan.

10. A centrifugal fan coupled to a transition duct, said centrifugal fan comprising a generally cylindrical body having a generally rectangular fan outlet having sides, a bottom and a top cutoff, said transition duct comprising a bottom plate section, two side plate sections extending upwardly from and joined to lateral edges of said bottom plate section, and a top plate section having a generally concave shaping along the longitudinal direction of the transition duct and having lateral edges joined to top edges of said side plate sections, said bottom, side and top plate sections forming a generally rectangular inlet opening having vertical side edges at one longitudinal side of said transition duct and a generally rectangular outlet opening having vertical side edges at the other longitudinal side of said transition duct, wherein said bottom plate section is straight and of lesser longitudinal length than said top plate section and, wherein said vertical edges of inlet and outlet openings are parallel to one another, and said fan outlet has an open area confined between the sides and the bottom of the fan and the top cutoff of the fan outlet coupled to the top plate of the inlet opening of said transition duct.

11. The transition duct of claim 10 wherein the side edges have sloping top edges such that the height of the inlet opening is less than the height of the outlet opening.

* * * * *

UNITED STATES PATENT AND TRADEMARK OFFICE
CERTIFICATE OF CORRECTION

PATENT NO. : 4,891,169

DATED : January 2, 1990

INVENTOR(S) : Kaplan, et al

It is certified that error appears in the above-identified patent and that said Letters Patent is hereby corrected as shown below:

On the title page item [73] should read:
  --Baltimore Aircoil Company, Inc., Jessup, MD--

Signed and Sealed this

Twenty-seventh Day of August, 1991

Attest:

HARRY F. MANBECK, JR.

Attesting Officer

Commissioner of Patents and Trademarks